United States Patent [19]

Levy

[11] 4,240,108
[45] Dec. 16, 1980

[54] VEHICLE CONTROLLED RASTER DISPLAY SYSTEM

[75] Inventor: Paul M. Levy, Dix Hills, N.Y.

[73] Assignee: Grumman Aerospace Corporation, Bethpage, N.Y.

[21] Appl. No.: 838,807

[22] Filed: Oct. 3, 1977

[51] Int. Cl.² ............................................. H04N 7/00
[52] U.S. Cl. .................................. 358/103; 358/109; 364/424
[58] Field of Search ............... 358/102, 104, 103, 109; 35/10.2, 12 N; 353/12; 364/424, 449, 450, 460

[56] References Cited

U.S. PATENT DOCUMENTS

| | | | |
|---|---|---|---|
| 3,131,247 | 4/1964 | Benamy et al. | 358/104 |
| 3,208,336 | 9/1965 | Vago | 88/24 |
| 3,233,507 | 2/1966 | Barych | 88/24 |
| 3,233,508 | 2/1966 | Hemstreet | 35/10.2 |
| 3,246,126 | 4/1966 | Schlieben et al. | 35/10.2 |
| 3,359,408 | 12/1967 | Briggs | 364/460 |
| 3,439,105 | 4/1969 | Ebeling | 35/10.2 |
| 3,507,993 | 4/1970 | Mulley | 358/103 |
| 3,567,852 | 3/1971 | Ett | 358/102 |
| 3,580,978 | 5/1971 | Ebeling | 35/10.2 |
| 3,899,662 | 8/1975 | Kreeger et al. | 364/424 |
| 3,945,720 | 3/1976 | Ellis | 353/12 |

Primary Examiner—Robert L. Griffin
Assistant Examiner—Edward L. Coles
Attorney, Agent, or Firm—Morgan, Finnegan, Pine, Foley & Lee

[57] ABSTRACT

Moving map and other navigational display systems are disclosed herein which provide indications of relative position between a vehicle such as an aircraft and the terrain or other point(s) of reference. Optical images of a particular segment of terrain (or other reference data) are opto-mechanically selected in accordance with gross vehicle position; the selected segment image is coupled to a vidicon system or flying spot scanner system. By controlling the deflection circuits and thus the geometry of the vidicon raster or flying spot raster as a function of position and orientation of the vehicle as it moves, i.e. by electronically traversing the selected terrain image in duplication of the vehicle's motion (in accordance with the selected display stabilization mode), and photo-electrically sensing the image elements, a video representation of the vehicle's relative location and motion is obtained. This video is then displayed along with other desired data on a cathode ray tube or other display device.

10 Claims, 3 Drawing Figures

VEHICLE CONTROLLED RASTER DISPLAY SYSTEM

BACKGROUND

Many aircraft employ moving map displays. On the military side, for example, they are used in the A-7D and A-7E as well as on the F-111D. They are also the subject of continuing development efforts in various military programs.

An optimal moving map display system for use in military aircraft would have the capability of providing a full color topographical map display with a high level of terrain detail under conditions of high brightness, contrast and resolution and in a system which satisfies current military constraints involving not only the usual environmental mil. specs. relating to shock, vibration, temperature, moisture, etc., but also the particularly stringent requirements of attack-type aircraft dealing with weight and cockpit space. Ideally, the display should be depictable on a multi-purpose cockpit display and have capabilities for radar superposition, real-time annotation, zoom/de-zoom, scaling, and selectable stabilization modes (e.g., "north-up", "track-up", or "heading-up"). To maximize operating life, to minimize mean time between failures and maintenance schedules, and to optimize reliability and ruggedness, the system should preferably have no or few moving parts.

An ideal system should also provide large area coverage (e.g., 450×450 nmr*) as well as accurate registration between the depicted terrain or other reference data and the vehicle indicator or other reference indicia.

*nautical miles

There are a wide variety of designs of moving map display systems. One type employs servo-driven film projector systems wherein the film position is mechanically positioned in accordance with vehicle position. These systems are capable of providing full color map renditions but are deficient in annotation capabilities and are burdened with the usual shortcomings associated with mechanical film translation and rotation schemes (e.g., weight and volume penalties, and less-than-optimum reliability and registration accuracy). As dedicated displays these systems also consume prime cockpit space.

Another technique involves the use of a computer generated map displayed on a CRT. This system is limited in the level of terrain detail that can be provided; only a schematic representation is displayed and it requires a dedicated computer to provide constant update of position and orientation.

Still another approach provides annotation capabilities in a combined optical/CRT system by means of a special rear-ported, CRT having one or more rear apertures or ports through which the optical terrain images and other data are projected; to annotate these presentations, the electron beam system of the CRT is appropriately deflected and modulated. Other combined displays optically combine CRT images with optical film projector images on a common screen, e.g., by using mirrors or prisms. In some of these combined systems holographic techniques are employed. These alternate methods generally have less-than-optimum brightness in the cockpit environment, consume substantial prime cockpit space and, to the extent they employ mechanical positioning, are burdened with the limitations previously described.

Some examples of the above-described display systems include the Horizontal Situation Display (HSD) system manufactured by Astronautics Corporation of America, the Projected Map System (PMS 4 & 5) manufactured by Computing Devices of Canada Ltd., and the AN/ASN 99 and Combined Display System (CDS-1) of the same company.

OBJECTS

It is an object of the invention to provide improved moving map display systems which have characteristics more nearly approaching the optimal attributes described above, particularly those applicable to attack aircraft applications. More specifically, it is an object of the invention to combine certain of the advantages of both optical projection and video systems while at the same time eliminating or minimizing many of the disadvantages inherent in both. Specific objectives of the invention are to provide a system which incorporates the video system features of high brightness, non-dedicated display, multiple stabilization modes, real-time annotation and radar superposition, as well as features associated with optical projection systems such as high level of terrain detail, high storage density, ease and economy of reproduction and editing, and other advantages associated with unit records.

THE INVENTION

The foregoing and other objects and advantages which will be apparent in the following description or in the practice of the invention, are achieved by the invention disclosed herein, which may generally be characterized as a display system for displaying relative motion between a vehicle and the terrain it is traversing, the system comprising:

(1) means forming an image of the segment of said terrain contiguous to the position of said vehicle;

(2) means for generating a raster for scanning a selected region of said terrain segment image;

(3) said image forming means being configured such that said terrain segment image remains fixed while said vehicle is moving in a contiguous relation to said terrain segment;

(4) means responsive to vehicle movement for deriving navigational data related to the position of said vehicle relative to said terrain;

(5) electronic beam deflection means responsive to said navigational data means for continuously displacing said raster to traverse the regions of said image in duplication of the vehicle traverse relative to said terrain;

(6) video generating means responsive to the raster-image interface for converting said region of said terrain segment image into video segments; and (7) display means responsive to said video signals.

THE DRAWINGS

Serving to illustrate exemplary embodiments of the invention are the drawings of which:

DESCRIPTION OF VIDICON EMBODIMENT

Figure 1:
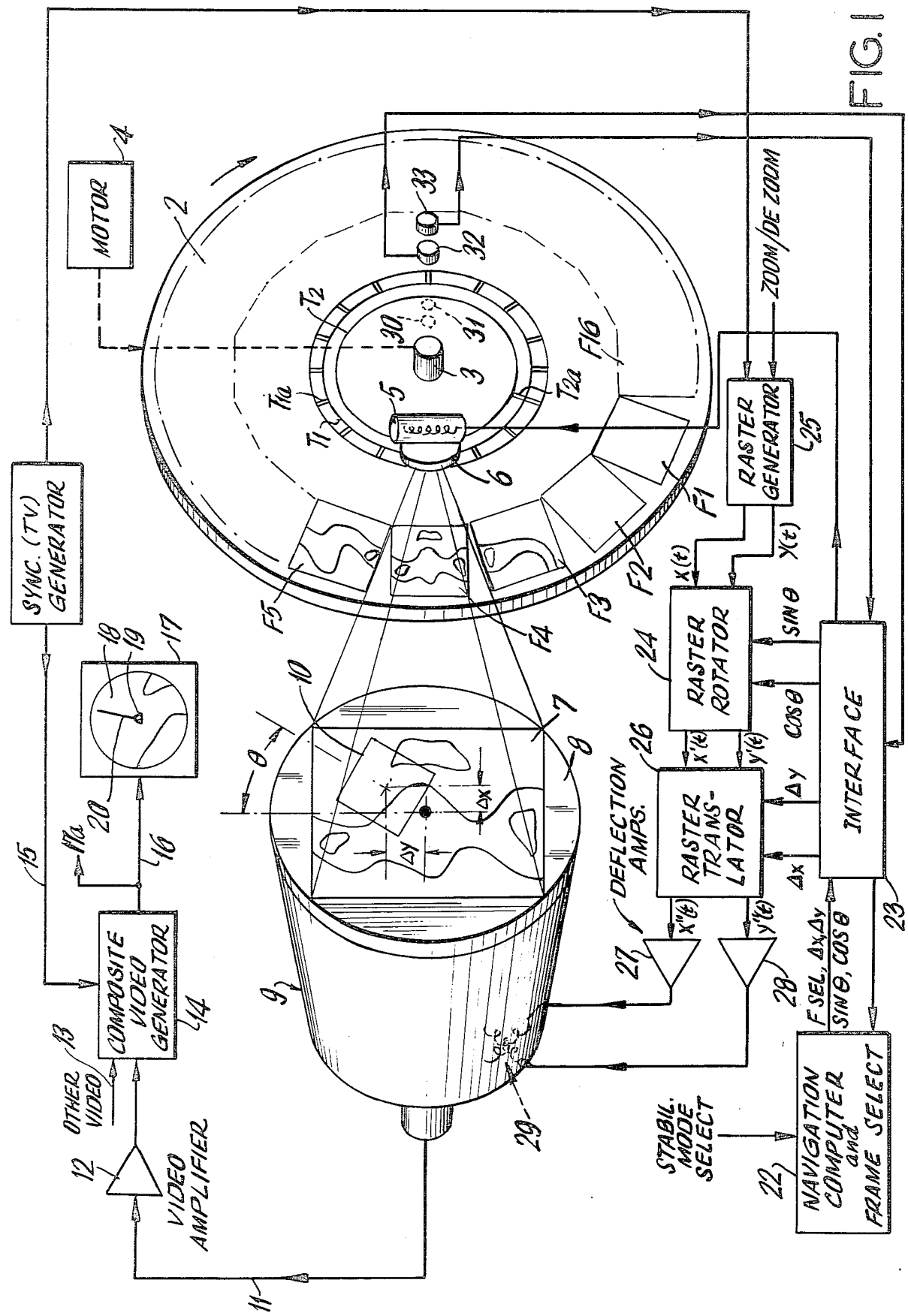
FIG. 1 is a partial perspective and schematic diagram of a vidicon system embodying the invention.

The strobed-disc embodiment is illustrated in FIG. 1. It includes an annular set of film transparencies F1, F2, F3 ... F16, arranged around the periphery of a disc 2 having a shaft 3 driven at an appropriate speed by a motor 4.

In the illustrated embodiment the disc is approximately six inches in diameter and contains sixteen transparencies of reduced maps or other pictorial or tabular data.

The disc 2 also includes two timing tracks T1 and T2, the former including sensible elements T1-a (apertured in this embodiment) corresponding to each frame and the latter constituting a "once around" track having a single aperture T2-a. Any appropriate track reading means may be employed, e.g., light sources in the form of light emitting diodes 30 and 31 for illuminating the apertures T1-a, T2-a, and cells 32 and 33 aligned respectively with the diodes 30, 31 to produce bits signifying each revolution of the disc, as well as the successive appearance of each of the frames in the imaging system described below.

Figure 3:
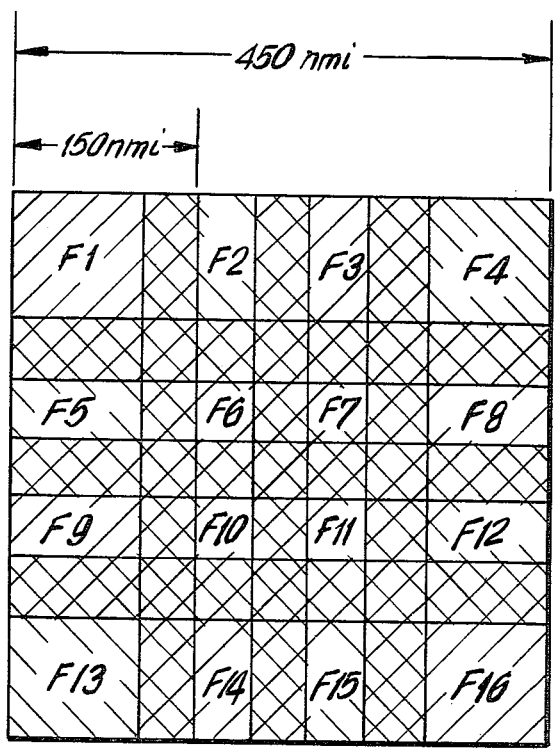
FIG. 3 is a graphic aid showing schematically the overlap of a set of photographic images of terrain sectors.

In an exemplary application each of frames F1, F2 ... F16 contains a transparency of a section of terrain which is 150 nautical miles (nmi) by 150 nautical miles. In addition, the peripheral area of the terrain image covered by each transparency ($\frac{1}{8}$ the total area)* overlaps with the periphery of certain of the adjacent terrain images on the other transparencies as schematically depicted in FIG. 3.

*for each border

As shown therein, frame F1 overlaps frames F2 and F5; frame F2 overlaps both frame F1 and F3 and also F6 and F7. As shown in FIG. 3, this pattern is repeated throughout the entire sequence F1, F2 ... F16; the result is a total mission map coverage of about 450 nmi by 450 nmi. As will be apparent in the ensuing description, this overlap avoids blanks in the display as frame borders are approached and also permits smooth transition between frames as contiguous terrain segments are traversed by the vehicle.

Returning to FIG. 1, the disc 2 carrying the frames F1, F2 ... F16 is located in an imaging system which includes a radiation source such as an xenon strobe lamp 5 which in combination with a suitable lens system having condensing optics 6 and imaging optics (not shown), projects the image stored on the intercepted transparency onto the target area 8 of a vidicon 9. Lamp 5 is controlled by appropriate logic circuits in an interface unit 23; these circuits are clocked from the clock track read elements 32, 33, to energize lamp 5 and synchronously strobe the selected frame each time it appears in the projection system.

Thus, during the period of operation depicted in FIG. 1, the image from transparency F4 appears repetitively as an image 7 on the high resolution vidicon photo-sensitive target during each revolution of disc 2, until such time as vehicle position or some other changed system input (e.g., a "look ahead" command) calls for selection and readout of a different frame.

In the illustrated case the instantaneous aircraft position, represented by data in navigation computer 22, falls within the section of terrain represented by frame F4. Accordingly, this position data from computer 22 causes logic circuits in the interface system to cause strobe firing which selects F4.

When the aircraft moves into the center of an overlap area, the logic circuits decide the next frame for selection based on the position and course data supplied by the navigation computer.

As will be explained more fully hereinafter, the deflection system 29 of the vidicon 9 is controlled as a function of system inputs, e.g., vehicle navigation data, to control the orientation and location of the raster 10 which in the illustrated embodiment nominally occupies one third by one third the total target area 7. This controls in turn that particular section of projected data (terrain) which is converted into an equivalent signal. The total area covered by the raster may also be varied by changing raster size by zoom/de-zoom control.

Video signals conforming to the raster area of the image are generated by vidicon 9 and transmitted via coupling circuit 11 and video amplifier 12 to a composite video generator 14. The generator also receives other appropriate annotating video data 13 and supplies in turn, via coupling circuit 16, a TV type composite video signal to a TV display unit 17 located in the cockpit of the vehicle. Connections via coupling 17a may be used for repeat displays at remote locations within and external to the aircraft.

In the illustrated example, the display unit 17 is depicting on its CRT screen 18 a moving map display and, in particular, the section of frame F4 which is being scanned by the raster 10.

The display unit 17 also includes the other controls normally associated with a CRT type display as well as appropriate indices, e.g., a vehicle marker 19 and a radial 20 which may represent heading for example.

As noted above, the particular frame F1, F2 ... F16 which is imaged on the vidicon 9 as well as the particular section of that image which is transduced into video signals is in the illustrated example a function of vehicle navigation data.

This navigation data is derived from the on-board Navigation Computer 22 which supplies related data to the interface unit 23. The latter supplies signals sin $\theta$, cos $\theta$ to a raster rotator 24 supplied by a raster generator 25. Offset coordinates $\Delta X$, $\Delta Y$ of aircraft position* are supplied from the interface unit to a raster translator 26 which also receives the output of rotator 24. The output of translator 26 includes both the offset coordinate and heading data and provides, via deflection amplifiers 27 and 28, suitable deflection signals to the vidicon deflection coils 29.

*i.e., offsets from the center of the selected frame; analog counterparts are in lower case notation The signals applied to the deflection coils determine the location and orientation of raster 10 relative to image 7 of target 8. In the illustrated example the raster is displaced from the center of the targetted image 7 by distance $\Delta x$ and $\Delta y$ and is rotated from a reference radial by the angle $\theta$.

One computational process for achieving this positioning involves supplying deflection signals x(t) and y(t) from the raster generator to the raster rotator 24. The latter also receives sin $\theta$ and cos $\theta$ where $\theta$ depends on the choice of stabilization mode; for example, and assuming image 7 is north-up: if the reference (0°) mark of display 17 represents true course, as in a "track-up" stabilized mode, then $\theta$ is the vehicle course angle; in a north-up stabilized mode $\theta$ is zero; in a heading-up stabilized mode, $\theta$ is vehicle heading.

The appropriate $\theta$ is obtained from computer 22 which supplies the sin $\theta$, cos $\theta$ signals to the raster rotator via interface 23.

From inputs x(t), y(t), sin θ and cos θ, the raster rotator generates the quantities x'(t) and y'(t) where $$x'(t) = x(t)\cos\theta + y(t)\sin\theta$$

and $$y'(t) = y(t)\cos\theta - x(t)\sin\theta$$

The analog signals representing these quantities are fed to translator 26 which also receives Δx and Δy and generates deflection control voltages $$x''(t) = x'(t) + \Delta x$$

$$y''(t) = y'(t) + \Delta y$$

These voltages are amplified via the respective deflection amplifiers 27, 28 as previously described, to thereby energize deflection coils 29 to position the raster 10 with coordinates ΔX ΔY and an angle θ.

As the vehicle moves relative to the actual terrain, corresponding aircraft position signals are generated in computer 22 and supplied to interface 23 for appropriate changes in the raster position and angular orientation; consequently, the raster in effect "flies" relative to the imaged terrain 7 in precisely the same manner as the vehicle traverses the actual terrain.

Choice of design parameters for the system of FIG. 1 should preferably follow engineering practices associated with airborne military equipment. Strobed disc 2, which serves as a bulk data storage unit, rotates at a constant speed although for first order effects, speed uniformity is not critical because strobe lamp 5 is pulsed under control of the frame clock bits derived from timing track T1-a in synchronism with the repetitive appearance of the selected frame in the optical projection system. The design parameters of disc speed, flash duration, vidicon persistence response time ("stickiness") and related factors should be established to avoid flicker and blur.

The vidicon embodiment has the potential for providing high density of information, and economy of reproduction of the bulk storage disc; mechanical complexity and consumption of prime cockpit space are also avoided as is the problem of marginal brightness. Additionally, the ability to store a 450 nmi×450 nmi mission map on a single 6 inch disc provides versatile means for mission customizing. Also, color reproduction is available by use of color vidicon systems employing, for example, three vidicon tubes each energized and controlled as shown for tube 9 in FIG. 1. Such color systems are well known.

The system of FIG. 1 can also provide other modes which include a fixed map/moving vehicle marker presentation as well as marker offset in the moving map mode.

FLYING SPOT SCANNER EMBODIMENT

Figure 2:
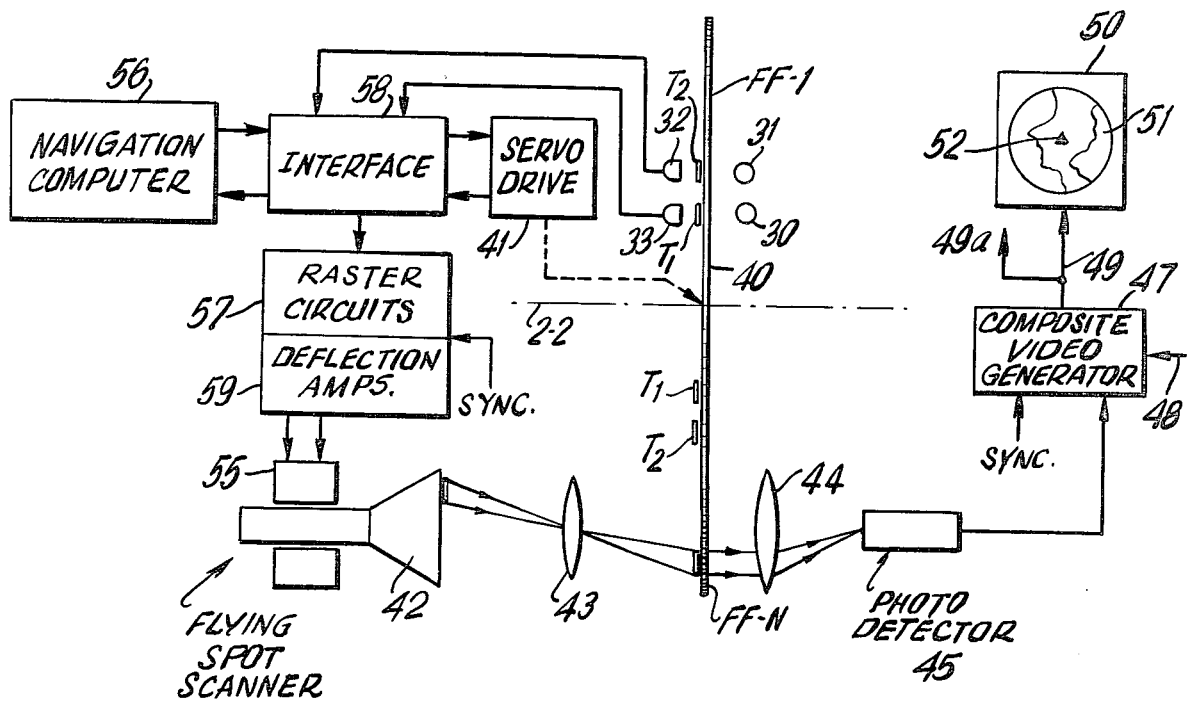
FIG. 2 is a schematic diagram illustrating a flying spot scanner embodiment of the invention.

An embodiment employing a flying spot scanner is illustrated in FIG. 2. It is analogous to the system of FIG. 1 but has certain advantages hereinafter noted, and differs in implementation as follows:

(1) The illumination source: The strobe lamp 6 of FIG. 1 is replaced by a flying spot scanner 42.

(2) The light-to-video transducer: The vidicon 9 of FIG. 1 is replaced by a photo-detector 45.

(3) The "flying" raster: The "flying" raster 10 of FIG. 1 which was imaged on the vidicon target, is instead imaged on the selected film frame FF-N of FIG. 2.

(4) Frame access: The light strobing of the spinning disc of FIG. 1 is replaced by the scanning of a stationary disc which is stepped to properly position the desired frame.

As shown in FIG. 2 a disc 40 positioned by drive 41 carries a series of transparencies FF-1, ... FF-N, and is rotatable on an axis 2—2. The transparencies are preferably arranged for this application in the same manner as the corresponding transparencies F1, F2 ... F16 in the vidicon embodiment. However, the disc 40 is not continuously rotated as is its counterpart 2 in the FIG. 1 system; rather it is rotated by a suitable drive, e.g., a servo 41 or stepping motor, to a single selected position depending upon vehicle position such that the transparency, e.g. FF-N, bearing the image of the terrain being traversed at that moment in time, is positioned in the optical field of a flying spot scanner system. Control of the drive servo to achieve this frame selection can be done from computer 56 via interface 58 in a manner analogous to the frame selection of FIG. 1.

As shown in FIG. 2, flying spot scanner 42 illuminates a portion (determined by raster size, position and orientation) of the selected transparency FF-N via a suitable lens system 43 on the incident side of disc 40, and another lens arrangement 44 on the exit side. As a consequence, the flying spot raster illuminates the appropriate portion of the image on the transparency FF-N; the illuminated section of the image is then detected by photo-detector 45.

The video output from detector 45 is applied to composite video generator 47. As in the FIG. 1 embodiment, the video generator may receive additional video input 48, with the composite TV type signal from the output thereof being coupled via circuit 49 to moving map display 50 having a TV screen 51 and other appropriate indicia such as a vehicle position marker 52. Other local and remote displays may be driven by branch 49A.

As in the case of the vidicon embodiment, the raster is positioned (and oriented depending on stabilization mode) relative to the selected transparency by controlling the deflection coils 55 of the flying spot scanner in accordance with vehicle offset coordinates ΔX, ΔY, and the selected orientation angle θ. To this end navigation computer 56 supplies the raster control circuits 57 via interface system 58 to control the raster position and orientation of flying spot scanner 42 in the same general manner as applies to the vidicon arrangement of FIG. 1. Translation of the raster relative to the transparency as a function of the aircraft's location data thus follows the same principles as are applicable to the system of FIG. 1. In addition, as with the vidicon arrangement, raster size may be controlled to provide zoom/de-zoom.

Full color reproduction and the other modes referred to in connection with FIG. 1 are also realizable. By reason of the use of photodetector, color reproduction is attained more readily. Further, the flicker and blur factors which must be considered in the vidicon embodiment, are not involved in the flying spot scanner system.

What is claimed is:

1. A map display system particularly adapted for airborne use in confined locations for displaying location of an airborne vehicle relative to the terrain comprising:

(1) means forming an image of the segment of said terrain contiguous to the position of said vehicle;

(2) means for generating a raster for scanning a selected region of said terrain segment image;

(3) said image forming means being configured such that said terrain segment image remains fixed while said vehicle is moving in a contiguous relation to said terrain segment;

(4) means responsive to vehicle movement for deriving navigational data related to the position of said vehicle relative to said terrain;

(5) electronic beam deflection means responsive to said navigational data means for continuously displacing said raster to traverse the regions of said image in duplication of the vehicle traverse relative to said terrain;

(6) video generating means responsive to the raster-image interface for converting said region of said terrain segment image into video segments; and (7) display means responsive to said video signals.

2. The system as defined in claim 1 in which said raster generating means comprise the raster system of a vidicon and said means forming an image comprise a film section and an optical system for projecting the film representation on the target area of said vidicon.

3. The system as defined in claim 1 in which said raster generating means comprise a flying spot scanner system and said means forming an image comprises a film bearing said image.

4. The system as defined in claim 1 in which said image forming means and raster generating means are coupled to maintain a linear relationship therebetween such that said video signals are adapted to reproduce said scanned region of the image without significant distortion.

5. The system as defined in claim 1 in which said electronic beam deflection means include means for offsetting said raster relative to a reference point of said image in accordance with the coordinate position of said vehicle relative to the point of said terrain corresponding with said reference point.

6. A map display system for displaying location of an airborne vehicle relative to the terrain comprising:

(1) a photographic representation of a segment of said terrain;

(2) a vidicon system having a target section and deflecting means;

(3) optical projection means including illuminating means coupled to said photographic representation for imaging said photographic representation on the target section of said vidicon system;

(4) raster control means coupled to said deflection means of said vidicon system and including means for generating a raster which occupies a sub-region of said image, said control means also including means responsive to the location and orientation of said vehicle for continuously locating and orienting said raster on the sub-region of said image in correspondence with the location and orientation of said vehicle;

(5) display means responsive to the output of said vidicon system for displaying said sub-region.

7. A map display system particularly adapted for airborne use in confined locations for displaying location of an airborne vehicle relative to the terrain comprising:

(1) means forming an image of the segment of said terrain contiguous to the position of said vehicle;

(2) means for generating a raster for scanning a selected region of said terrain segment image;

(3) said image forming means being configured such that said terrain segment image remains fixed while said vehicle is moving in a contiguous relation to said terrain segment;

(4) means responsive to vehicle movement for deriving navigational data related to the position of said vehicle relative to said terrain;

(5) electronic beam deflection means responsive to said navigational data means for continuously displacing said raster to traverse the regions of said image in duplication of the vehicle traverse relative to said terrain;

(6) said electronic beam deflection means being energized and controlled to displace and rotate said raster as a function of motion of said vehicle and stabilization mode;

(7) video generating means responsive to the raster-image interface for converting said region of said terrain segment image into video segments; and (8) display means responsive to said video signals.

8. A map display system for displaying location of an airborne vehicle relative to the terrain comprising:

(1) a cyclical member carrying a plurality of photographic representations of segments of said terrain;

(2) a vidicon system having a target section and deflecting means;

(3) optical projection means including illuminating means coupled to one of said photographic representations for imaging said photographic representation on the target section of said vidicon system;

(4) said optical projection means including pulsing means responsive to the location of said vehicle for controllably energizing said illuminating means to illuminate a particular photographic representation in accordance with vehicle position;

(5) raster control means coupled to said deflection means of said vidicon system and including means for generating a raster which occupies a sub-region of said image, said control means also including means responsive to the location and orientation of said vehicle for continuously locating and orienting said raster on the sub-region of said image in correspondence with the location and orientation of said vehicle; and (6) display means responsive to the output of said vidicon system for displaying said sub-region.

9. A map display system for displaying location of an airborne vehicle relative to the terrain comprising:

(1) a photographic representation of a segment of said terrain;

(2) a flying spot scanner system having beam deflecting means for forming a raster;

(3) means for illuminating a sub-region of said photographic representation with said raster of said flying spot scanner system;

(4) photo detection means for converting said illuminated region into video signals;

(5) raster control means coupled to said deflection means of said flying spot scanner system and connected to be responsive to the location and orientation of said vehicle for continuously locating and orienting said raster on the sub-region of said image in correspondence with the location and orientation of said vehicle;

(6) display means responsive to the output of said photo detection means for displaying said sub-region.

10. The system as defined in claim 9 including a plurality of said photographic representations, and means for coupling to said illuminating means one of said plurality in accordance with vehicle location.

* * * * *